(12) United States Patent
Seefeldt

(10) Patent No.: US 6,420,801 B1
(45) Date of Patent: Jul. 16, 2002

(54) ALTERNATIVE POWER SUPPLY CONNECTION

(75) Inventor: William J. Seefeldt, Monticello, MN (US)

(73) Assignee: Electro Industries, Inc., Monticello, MN (US)

(*) Notice: Subject to any disclaimer, the term of this patent is extended or adjusted under 35 U.S.C. 154(b) by 0 days.

(21) Appl. No.: 09/547,233

(22) Filed: Apr. 11, 2000

(51) Int. Cl.[7] .................................................. H02J 7/00
(52) U.S. Cl. ........................................................ 307/64
(58) Field of Search ................................... 307/64, 125

(56) References Cited

U.S. PATENT DOCUMENTS 6,188,145 B1 * 2/2001 Stewart ........................ 307/64

* cited by examiner

Primary Examiner—Edward H. Tso
Assistant Examiner—Pia Tibbits

(74) Attorney, Agent, or Firm—James R. Cwayna

(57) ABSTRACT

A connector and connection arrangement for connecting an alternative power supply to a user incoming electrical power center, commonly referred to as the load center or breaker panel, when power from a utility power source is not being received. The connection includes an individual housing for the connection to the alternative supply or the connection may be located in a common housing which houses both the connector and the utility meter. The alternative supply is connected to the load connected and load feeding side of the meter socket and is electrically positioned in front of the load circuit breaker panel which normally includes the individual service disconnects. The connection includes at least one and preferably a pair of open-center switches and a sensing circuit therefore to sense receipt or termination of utility power delivery to the user to actuate such switches and open the utility supply switch and close the switch to the alternative source only after two indications of power supply stoppage are determined. When utility power is restored, the alterative source is disconnected and the utility power is reconnected.

13 Claims, 1 Drawing Sheet

ALTERNATIVE POWER SUPPLY CONNECTION

This invention is not made under any Federally related nor Independent sponsorship and is the sole result of the named inventor.

RELATED APPLICATIONS

Applicant has not filed nor is he aware of any applications filed by others that should be considered during the prosecution of this application.

FIELD OF THE INVENTION

This invention relates generally to the connection of an alternative supply of electrical power in the event that utility, normally provided power, is interrupted and more specifically to such a connection which provides for close proximity of the alternative supply to the normally provided utility meter which allows for the connector to be maintained in a separate but nearly located housing or within the same housing that also accommodates the meter socket and thus utility input but which provides for physical isolation of the two entities. A pair of open-center switches are provided, a first between the utility supply and the user or load distribution panel and the second between the alternative source and the user or load distribution panel. Control circuitry is provided to sense utility power availability and upon cessation thereof, to open the first switch and upon a two step verification of such outage, to close the second switch and provide power from the alternative source to the load distribution panel. Upon utility service being reestablished, the procedure is reversed. At no time is there a possibility of the two power sources feeding the load nor the possibility of the alternative source reverse feeding the utility power transmission line.

SHORT SUMMARY OF THE INVENTION

An alternative power supply connection or connector is provided such that an alternative supply of power, such as a generator, may be positioned in close proximity to the electric utility meter and feed the rear side of the meter socket to bypass the meter and directly feed the user or load. Such positioning places the alternative supply in electrical front to the distribution panel of the load location and therefore in electrical front of the normally provided main service breaker of the load. The connection provides that the meter socket, alternative supply, connector and various controls therefore may be provided in a single housing which includes an isolation, physical divider, between the socket and alternative supply and which includes two distinctive cover panels to complete the isolation.

Two individual, open-center switches are provided. One such switch is arranged between the rear of the socket and the load distribution panel with the other between the alternative source and the distribution panel. Control circuitry is provided to sense utility power receipt and upon cessation thereof and at least a pair of verifications of the same, the first such switch is opened and the second switch, controlling communication between the alternative power source and the load distribution panel is closed. Upon sensing of utility power availability, the switching function is reversed to open the second switch to the alternative power source and close the first switch to the utility to restore utility service to the load.

Obviously, means for starting the alternative power source, if a fueled generator, must be included.

BACKGROUND AND OBJECTS OF THE INVENTION

Means for providing an alternate power source to insure continuous or relatively continuous power supply to a user when utility transmission fails is not new to the art of electrical power transmission.

The simplest of such forms is a purely mechanical open-center, dual contact swing arm which simply, upon manual application of force, shifts the contactor arm from contact with the utility lines to the alternative source lines. Obviously, the output from the contactor arm directs received power to the distribution panel of the load location where it may be further divided into various operative circuits through a distribution panel.

The applicant's invention combines two open-center switches with a control to automatically close and open the same such that at no given instance is power delivered to the load location from two sources, the utility power cannot feed the alternative source and the load nor can the alternative source back feed the utility connection while providing power to the load.

To insure that no common transmission is ever provided, at lest a dual verification of utility power cessation is required prior to alternative power connection and transmission.

As designed, Applicant's unit allows for placement of the alternative source in close proximity to the provided utility meter socket and, in fact, provides that the connection to the alternative source may be positioned within a common housing with the meter socket but separated therefrom by a physical barrier with individual cover panels covering each portion of the common unit.

It is therefore an object of the Applicant's invention to provide an alternative power source connection which includes means for connecting an alterative power supply to the load side of a utility meter socket with an open-center switch between the alternative supply and the load distribution control panel.

It is a further object of the Applicant's invention to provide an open-center switch between the utility meter socket and the load distribution control panel.

It is a further object of the Applicant's invention to provided control circuitry for a pair of open-center switches which independently control power transmission from utility transmission lines to a load distribution control panel and an alternative source of power to the load distribution control panel which insures complete cessation of utility power provision prior to allowing power to be transmitted between the alternative source and the load distribution control panel and reversing the procedure upon reestablishment of utility power transmission.

These and other objects and advantages of the Applicant's invention will more fully appear from a consideration of the accompanying description and drawings and in which:

SHORT DESCRIPTION OF THE DRAWINGS

Figure 3:
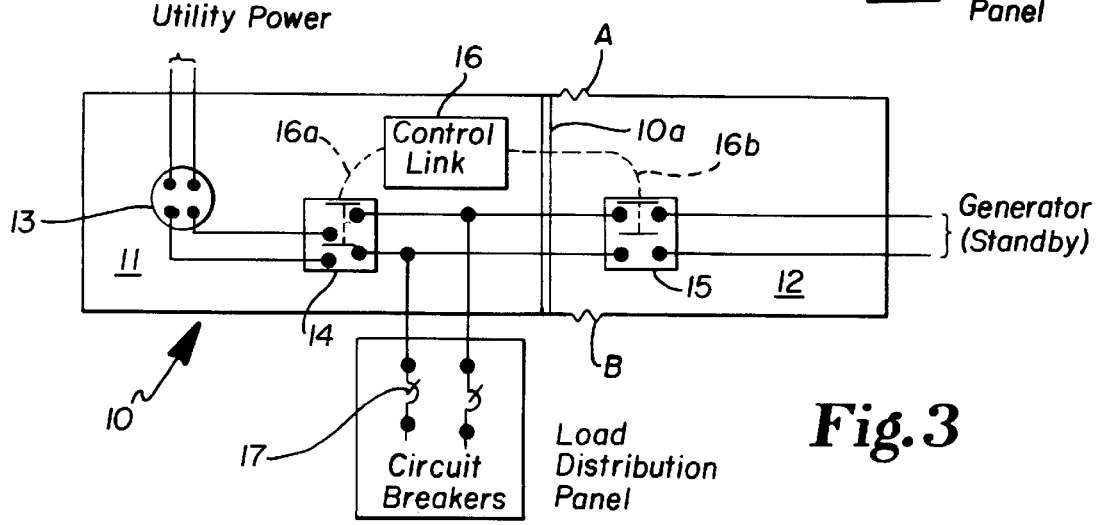
Figure 4:
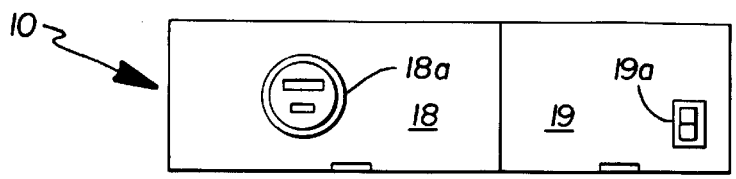

FIG. 3 is a schematic, block illustration of the invention incorporating Applicant's concepts and illustrating the alternative power source connection and first open-center switch in one area of a common housing with the utility meter socket and second open-center switch in a second area of a the common housing and illustrating the control circuitry in relation thereto. A broken line suggests separation of the two housing components by a physical separator; and, FIG. 4 is an illustration of a common housing and the individual panels covering the two sections thereof.

DESCRIPTION OF A PREFERRED FORM OF THE INVENTION

In accordance with the accompanying drawings, examples of the Prior Art particularly illustrate the improvements that Applicant's concept provides. With Applicant's invention a positively open-center position is provided that is obtained through the utilization of a pair of open-center switches which are controlled through a control circuit that will only switch from utility power to standby or generated power when at least two indications of utility power cessation have occurred.

Figure 1:
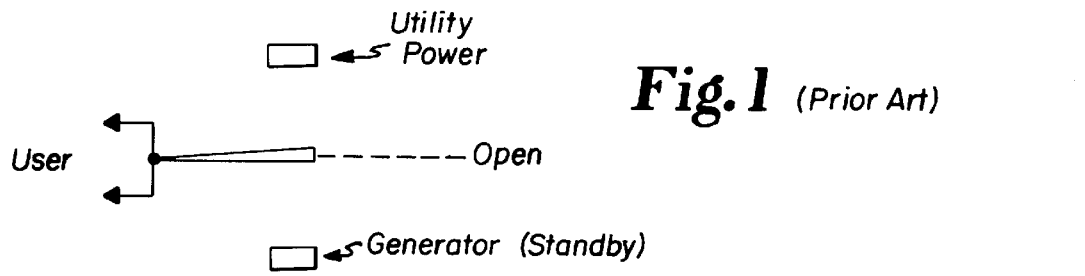
FIG. 1 is an illustration of a mechanical, open-center power transmission switch as utilized in the Prior Art.
Figure 2:
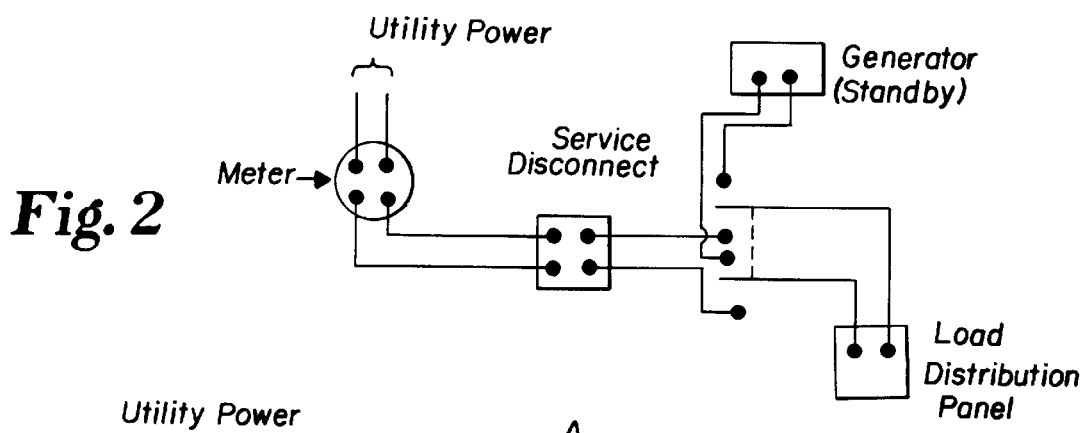
FIG. 2 is a block schematic illustration of a typical, prior art electrical switching system, for connection of an alternative power source to a load distribution panel, illustrating the location of the alternative power supply electrically subsequent to the load service disconnect but electrically prior to the load distribution panel.

The Prior Art drawing of FIG. 1 provides a simple mechanical contactor arm which is moved from one power source to the other to obtain switching while that of FIG. 2 illustrates the normal placement of the standby power source which is subsequent to the service disconnect to the distribution panel of the user. Another, not illustrated, situation which is similarly common is the placement of the standby unit to feed only select ones of the load distribution lines. For example, a furnace circuit and a house lighting circuit could be solely supplied from the standby unit and in such instance, the standby unit is electrically subsequent not only to the service disconnect but may also be subsequent to the individual circuit, circuit breakers.

The prior art then is always concerned with proper initiation of and contact between the utility power supply and the standby power supply such that two are never in opposition to each other and one will not be introduced to the load until the other has been discontinued.

Applicant's concept and system provides for and insures the same.

A normal, present day installation desires that the standby power source be located near the utility meter and utility meter socket to eliminate noise of the generator. This normally requires a separate housing for the generator/meter socket connection. Applicant's concept and invention also provides that these units may be commonly but separately housed with access panels to the individual portions thereof so as to provide two independent units.

Applicant's arrangement is illustrated in FIGS. 3 and 4 of the drawings wherein his concept is provided with a single but internally separated housing.

As illustrated in FIG. 3, a dual housing 10 is provided having a separator 10a therein to divide the same into a utility power side 11 and an alternative power side 12. Within the utility side 11 the meter socket 13 and an open-center switch 14 is provided which is connected to the meter socket to receive power therefrom. Within the alternative power side 12 a second open-center switch 15 having one side connected to the alternative power source is provided. Also illustrated, selectively, within the utility power side 11 is a control link 16 consisting of at least a microprocessor which is electrically linked, the links 16a, 16b illustrated through dotted lines, to the open-center switches 14, 15 for control thereof The other side of switches 14, 15 provide a common connection to the entrance side of the load distribution panel which therefore provides electrical power internal, breaker control. The power entrance to the distribution panel is, as is normal, electrically ahead or up-line to the panel switch control 17.

Break links A, B are shown in the housing 10 walls to illustrate the manner in which separation of the two sections of the same may be accomplished but, in practice, the alternative power supply connection will be mounted closely to the utility meter socket. When utilized as a singular unit, separate housing doors or closure panels 18, 19 are provided which will provide a meter opening 18a and a switch 19a to actuate the alernative power source if not otherwise controlled. Closure and locking means may be provided for such access panels 18, 19.

The control link 16 microprocessor provides links to read and set the positions of the open-center switches 14, 15. In normal situations where utility power is supplied from the utility power source the flow, switch 14 is in position to transmit power from the utility through the meter and meter socket during which time the meter will be running and recording power useage and switch 15 will be open and the generator or other alterative power source will not be connected nor operative. Power then is delivered from the utility to the load distribution panel. Upon cessation of utility power delivery, the control link 16 through its linked connection to the switch 14 or connecting lines from the meter 13 senses that no power is being delivered. With applicant's control, two distinct signals of power outage must be sensed prior to opening of switch 14 and closing of switch 15 and generator ignition, if fueled, or battery connection is made.

The two signals that must be sensed by the control link 16 is the lack of power verification and selectively the flickering of a light or light turn off or an audible signal. Therefore the control link may be provided with a light sensor responsive to a light directly from the utility lines or from a user position. After this positive, two occurrences of cessation sensing, switch 14 is opened and switch 15 is closed to now allow power transmission to the load distribution panel from the alternative source.

With Applicant's concept total control is maintained over the two open-center switches such that one cannot be closed unless the other is open. This safety factor insures that at no time is it possible that utility power is available or connected while generator power is available and connected and similarly, generator power is not available until the two verification of utility power cessation has been made.

Obviously, the means for actuation of the two open-center switches may be accomplished through a variety of device including relays all of which are controlled through the, preferably, microprocessor of the control link unit 16.

Switch 19a provided on panel 19 allows a separate control to the generator or alternative power supply and may be considered to be an override to operation and connection of the same.

As described, the single housing unit with duplex, individual housings provides a unit that will completely isolate service personnel from the other provided power source to enable the servicing therefore. This provides the same safety concept as is available where a separate connective housing for the alternative supply connection is provided.

It should be obvious that the concept provided herein provides a unique concept for interconnection of power sources to insure complete isolation of the operative connections thereof.

What is claimed is:

1. An electrical connection and transmission device for supplying power from an alternative power source to a load location in the instance and condition of utility power interruption, the utility power transmission system normally including a meter socket, a connection from the utility power to the meter socket and a connection from the meter socket to the load location, said connection and transmission device including;
   a) a source of alternative power;
   b) means connecting said alternative power source to the load location;
   c) open center switch means between said meter and the load location and said alternative power source and the load location; and,
   d) a control link controlling said open center switch means to shift said switch means between positions of connecting said utility power source to the load location and connecting said alternative power source to the load location whereby utility power transmission is terminated and power from said alternative source is not deliverable to the utility power source and is only deliverable to the load location.

2. The electrical transmission and connection device as set forth in claim 1 and said control link requiring at least one utility power transmission cessation indication prior to shifting to said alternative power source transmission.

3. The electrical transmission and connection device as set forth in claim 1 and said control link requiring two utility power transmission cessation indications prior to shifting to said alternative power source transmission.

4. The electrical transmission and connection device as set forth in claims 1 wherein
   a) said open center switch means includes a pair of open center switches, a first such switch arranged between said meter socket and the load location, the second such switch arranged between said alternative power source and the load location; and,
   b) said control link controlling both such switches to shift said first switch to open position upon cessation of transmission of power from the utility power source and closing said second switch upon verification of cessation of transmission of power from the utility power source.

5. The electrical transmission and connection device as set forth in claim 4 wherein verification of cessation of transmission of power from the utility power source includes a first verification of cessation of transmission of power from the utility power source and a second verification of cessation of transmission of power from the utility power source available from the load location.

6. The electrical transmission and connection device as set forth in claim 5 wherein said second verification of cessation includes a visual indication of such cessation.

7. The electrical transmission and connection device as set forth in claim 5 wherein said second verification of cessation includes a non-visual indication of such cessation.

8. The electrical connection and transmission device as set forth in claim 4 wherein
   a) the meter socket, said first of said switches and the connection from the meter socket to the load location is maintained in a first housing;
   b) said second of said switches and the connection from said alternative power source to the load location is maintained in a second housing; and,
   c) said control link is selectively arranged in said first or second housing.

9. The electrical connection and transmission device as set forth in claim 4 wherein said pair of switches, the meter required connections to the utility and alternative power source are maintained in a single housing divided to provide two electrically distinct and isolated sections, a first of such sections including the meter and the first of said switches, the second of such sections including the second of said switches and said means for connecting said source of alternating power, said control link being arranged in a selected one of said section.

10. The electrical connection and transmission device as set forth in claim 8 and separate access panels provided in association with said single housing to allow selective access to each of said sections.

11. The electrical transmission and connection device as set forth in claim 1 and said control link including control means to activate said alternative power source for delivery of power therefrom.

12. The electrical transmission and connection device as set forth in claim 1 and said control link including:
   a) means for continually sensing power transmission from said utility power source and sequentially shifting said open center switch to shift the same and disconnecting transmission from said alternative power source and connecting transmission form the utility power source upon sensing power delivery from the utility source.

13. A device for transferring power to a load between a utility power source and an alternative power source comprising:
   a housing having a utility power side and an alternative power side;
   a separater electrically isolating the utility power side from the alternative power side;
   a meter socket located in the utility power side;
   a first open-center switch located in the utility power side;
   a second open-center switch located on the alternative power side; and
   a control link coupled to the first open-center switch and the second open-center switch, operably configured such that one of the open center switches cannot be closed unless the other is open.

* * * * *